Sept. 8, 1959 F. R. SMITH 2,902,916
ENCLOSURE PRESSURE CONTROL MECHANISM
Filed Dec. 21, 1955 2 Sheets-Sheet 1

INVENTOR
FRANK R. SMITH

Sept. 8, 1959  F. R. SMITH  2,902,916
ENCLOSURE PRESSURE CONTROL MECHANISM
Filed Dec. 21, 1955  2 Sheets-Sheet 2

Inventor
F. R. Smith
By Glascock Downing Seebold
Attys.

United States Patent Office 2,902,916
Patented Sept. 8, 1959

2,902,916

ENCLOSURE PRESSURE CONTROL MECHANISM

Frank Roy Smith, Yeovil, England, assignor to Normalair Limited, Yeovil, England Application December 21, 1955, Serial No. 554,576

Claims priority, application Great Britain December 31, 1954

4 Claims. (Cl. 98—1.5)

This invention relates to a system for applying and mechanisms for controlling pressure in an enclosure such as, for example, an aircraft cabin, decompression or test chamber, instrument chamber or pressure suit applicable to aviation or marine requirements.

The invention provides an enclosure pressure control system of particular value when air is in short supply and which maintains enclosure pressure at the required value either by discharging surplus air from the enclosure or by admitting additional air from a pressure source to the enclosure when pressure in the enclosure falls below a predetermined value. The admission of air is controlled by a pressure responsive or actuated demand valve.

The present invention as disclosed herein is designed for, but not limited to, use in aircraft and more particularly in aircraft operating at high altitudes and for pressure flight of relatively short duration.

In the case of some types of aircraft, such as for example, fighter or research aircraft, pressurising of the cabin or other enclosure may be required only for short periods so that the usual system of applying and maintaining cabin pressure heretofore employed are unnecessarily cumbersome, complicated and costly and in some cases when an aircraft is rocket propelled, a supply of compressed air, more generally provided by the propulsive engine compressor or other mechanically driven unit is not available.

One object of this invention is to provide a simplified means for providing and controlling pressure in a confined space such as an aircraft cabin, whereby pressure is supplied and maintained from an independent source such as compressed air bottles and whereby any loss of pressure in an enclosure through, for instance, leakage or inadequate supply for maintaining cabin pressure or through temporary and/or deliberate reduction of pressure supply is supplemented by the operation of a demand valve in direct communication with the pressure source.

A further object of the invention is the conservation and utilisation of compressed air which may be used to ventilate a second enclosure such as a pilot's suit or instrument chamber in that such air, after passing through the said second chamber, is discharged into the cabin and so utilised to maintain pressure in the cabin.

The invention consists in pressure regulating mechanism in which pressure in an enclosure is regulated by a control apparatus in direct communication with a pressure source.

The invention also consists in pressure regulating mechanism wherein the pressure control apparatus controls a discharge valve having on the surface exposed to cabin pressure an extendable bellows, flexible diaphragms or other movable element.

The invention also consists in pressure regulating mechanism having a valve unit combining a discharge valve, an inward relief valve, an outward safety relief valve and a demand valve.

The invention also consists in the provision of a system of cabin pressure control embodying a combination of a supply of high pressure air, a pressure control apparatus in direct communication with an air pressure source, a discharge valve responsive to said pressure control apparatus, a demand or inlet valve operated by a bellows device responsive to differential pressure or operated by external means, a pressure relief valve responsive to pressure differential between enclosure pressure and ambient pressure and a safety valve responsive to pressure differential between enclosure pressure and ambient air.

The invention also consists in the provision of a system of cabin pressure control having a self-contained source of supply of high pressure air in which the pressure control apparatus is in direct or indirect communication with the said source of high pressure air supply and in direct or indirect communication with ambient air.

The invention also consists in pressure regulating mechanism in which the demand or inlet valve is in communication directly with the pressure source.

Referring to the accompanying diagrammatic drawings.

In carrying the invention into effect according to one convenient example as applied to a rocket propelled aircraft of short flight duration in which a pilot is incased in a ventilated suit, air is supplied to the suit from a pressure source such as compressed air bottles via suitable pressure reducing and manual control valves. After passing through the pilot's suit air is discharged from the suit to the cabin and utilised for maintaining pressure in the cabin.

Within the cabin is located a pressure control apparatus $a$ and the details thereof will later be more fully described. The casing housing the pressure control apparatus is sealed from communication with cabin pressure but is in direct communication by a pipe $b$ with a pipe $c$ leading from the pressure source, air flow passing through a small orifice or restriction to the pressure control apparatus.

Figure 1:
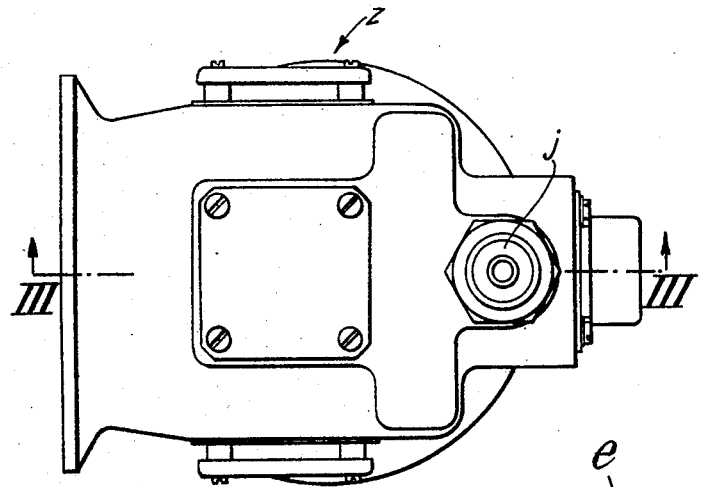
Figure 1 is a plan view of a convenient construction of pressure regulating mechanism embodying the present invention.
Figure 4:
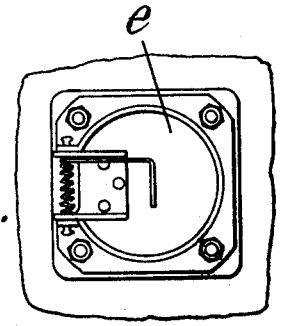
Figure 4 is an elevational view of a detail.
Figure 2:
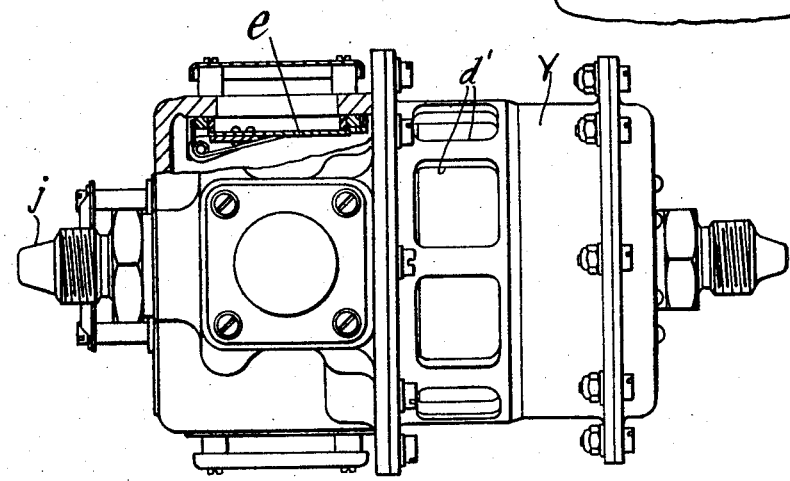
Figure 2 is an end elevation thereof.

The pressure control apparatus $a$ is set to maintain a suitable cabin pressure in conjunction with a pressure discharge valve $d$ with which it is in communication. The discharge valve is housed in a casing Z located exteriorly of cabin C. The discharge valve is open to cabin pressure at $h$ and the casing Z also houses an inward relief valve $e$, an outward safety valve $f$ which respectively communicate with the cabin pressure and the atmosphere and an extendable bellows $k$ located within casing extension Y which houses the discharge valve $d$ which bellows is exposed to cabin pressure within the casing Z. Also, it will be seen in Fig. 2 that the discharge valve $d$ is in communication with the atmosphere by means of slots $d'$ provided in the extension Y of the casing Z. In addition, a diaphragm D is secured between the wall of the extension Y and the lower end of the valve $d$. Within the casing is also located a high pressure or demand valve $i$ in direct communication with the source of high pressure by way of pipe $j$ which, in the present example, is comprised of a plate valve $i$ backed by a bellows $g$ which is in internal communication with cabin pressure by way of a bleed hole $m$ so resulting in a balanced valve. Located between this demand valve and bellows $k$ is a bell crank $n$ rotatable on a fulcrum pin $o$ and provided with adjustable set screws p and q which are set in such a manner that they are just clear of contacts on the centres of the bellows k" and valve i respectively. During flight of the aircraft the pilot has manual control of the supply of compressed air passing to or through his suit, thereby controlling his ventilation requirements, air discharged from the pilot's suit to the cabin, being utilised to maintain pressure in the cabin when it is required.

From ground level to a predetermined altitude it is generally unnecessary to pressurise the cabin and should the pilot require a ventilating flow of air throuugh his suit, the air which flows from his suit to the cabin will pass from the cabin out through the discharge valve which readily opens until a predetermined altitude has been reached. Upon the aircraft reaching an altitude at which cabin pressurisation becomes necessary the discharge valve d will automatically be closed by the pressure control apparatus a and air flowing from the pilot's suit will be used to provide cabin pressurisation. The discharge valve automatically functions over the entire altitude range of the aircraft to release excess pressure from the cabin.

Should, however, the supply of pressure air be inadequate or temporarily reduced either through the pilot reducing the inflow into his suit, on account of over ventilation, or should leakage of air out of the cabin be in excess of input, the cabin pressure will fall and cause a pressure differential across the bellows k on the discharge valve d resulting in an expansion of the bellows which in turn opens the inlet or demand valve i, by means of bell crank n, communicating with the high pressure air supply and compressed air will then flow into the cabin until a normal pressure balance is restored and continue to flow so long as the controlled supply flow is inadequate to maintain the required cabin pressure. When the cabin pressure falls a predetermined value, thus allowing further expansion of the bellows k whereby opening movement is transmitted to the valve i through the bell crank n.

If up to the non-pressurised altitude the pilot has not found it necessary to have a flow of ventilating air from the pressure source through his suit, when the aircraft reaches an altitude at which cabin pressurising is necessary, the pressure control apparatus will operate to close the cabin discharge valve d and open the demand valve i allowing air to pass direct from the pressure source to the cabin. In conditions of rapid dive or climb of the aircraft the apparatus operates automatically to ensure a safe cabin pressure being maintained.

In addition to air flowing from the pilot's suit to the cabin, air may flow from instrument chambers to the cabin or from any part of the aircraft which requires a flow of ventilating or cooling air from the pressure source.

The inlet or demand valve may be of any convenient form, e.g. servo operated or bellows or capsule operated, as shown, and may be of the tilt type, spring operated type or piston operated type and may be direct or remotely controlled by electrical, pneumatic, hydraulic or mechanical means.

Figure 3:
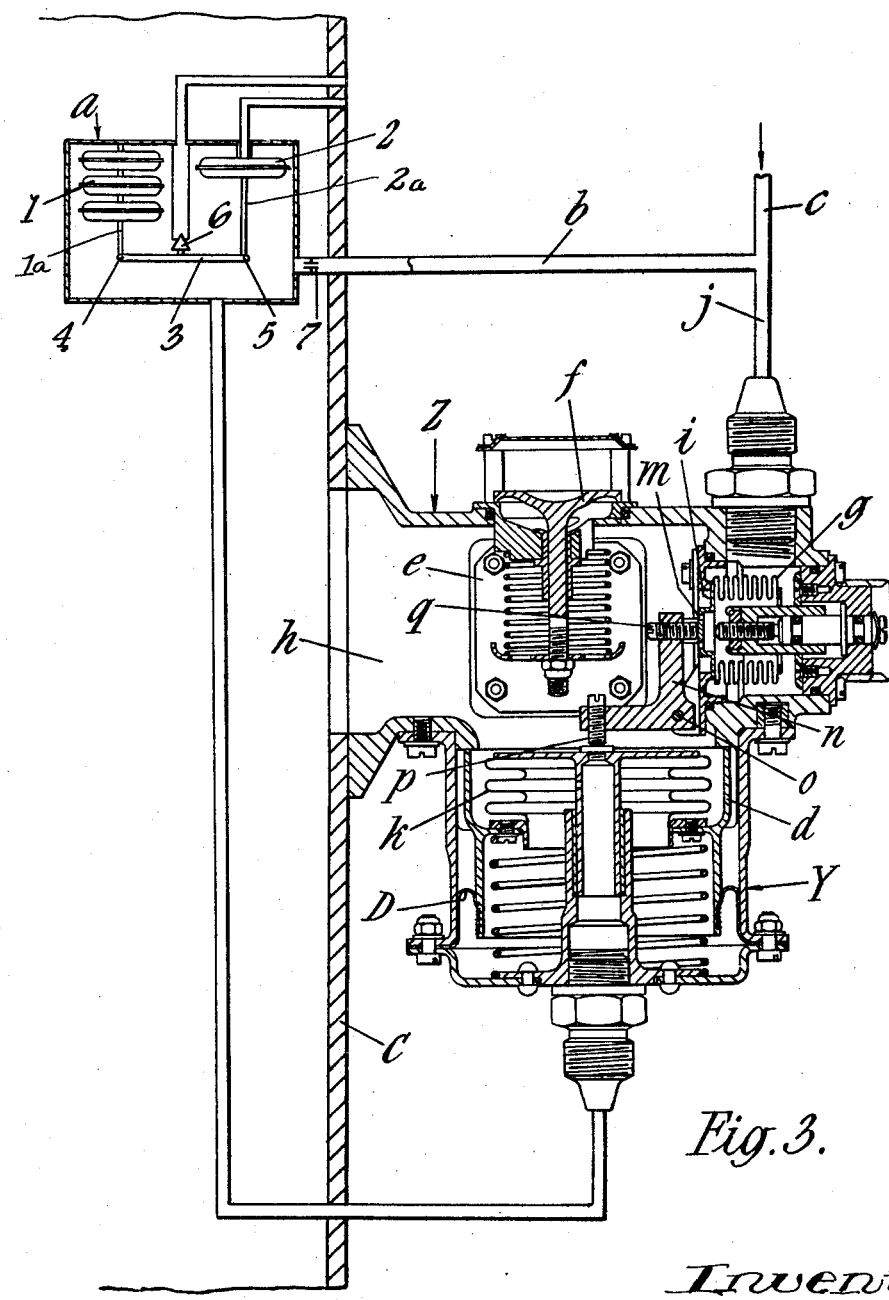
Figure 3 is a vertical sectional view on the line III—III of Figure 1.

As shown in Figure 3, the control device a includes an evacuator capsule 1 and a pressure differential capsule 2. The capsules 1 and 2 are provided with extensions 1a and 2a which extensions are pivotally connected to a beam 3 at points 4 and 5 respectively. A small valve 6 associated with the beam 3 controls communication between the interior of the control device and the ambient atmosphere.

In operation, fluid pressure, which may be cabin pressure, enters the control device a by way of a restricting orifice 7 and passes to the bellows chamber of the discharge valve to control the movement of such valve. The pressure within the control device and hence the discharge valve controlling pressure, independent of the operating characteristics of the two capsules which expand and contract, opening and closing the valve 6 to maintain a particular control pressure and thus a substantially constant cabin pressure.

The pressure control apparatus a may be in communication with or form part of the discharge valve unit. The discharge valve unit may be in communication with or form part of the relief valve unit. The safety valve unit may be part of or independent from the relief valve unit. The high pressure inlet or demand valve i may be independent from the pressure control apparatus a or form part of and be integral with said apparatus. Said inlet or demand valve i may be independent from or integral with said discharge valve.

As in installations of enclosure pressure supply and control of the type referred to it is necessary to carry or have compressed air in some convenient form rather than obtain the air from the atmosphere, a system of pressurisation combining maximum economy of air and minimum consumption of air is of utmost importance. The essential requirements of such a system applied to aircraft and carried by an aircraft is the provision of sufficient air to maintain a pressure in a cabin when such a pressure is desired and to ventilate the pilot's suit or instruments in the aircraft without substantial loss of air from the cabin pressurising source.

I claim:

1. In a mechanism for controlling the pressure within an aircraft cabin, a self contained supply of high pressure air on the aircraft, a pressure control means in direct communication with said air pressure source, a casing support exteriorly of the cabin and having a duct in communication with the interior of the cabin, a discharge valve in the casing adapted to establish communication between said duct and the atmosphere, means connecting the discharge valve to the pressure control means, the discharge valve being responsive to the pressure control means and to the cabin pressure, an inlet valve in the casing comunicating with the duct and in direct communication with the high pressure air, a bellows operatively associated with the inlet valve and in communication with the pressure in the duct, and means operatively connected to the discharge valve and to the inlet valve operative on the pressure conditions existing in the duct to open one valve and close the other valve and vice versa.

2. The mechanism claimed in claim 1 wherein said means operatively connected to the discharge and inlet valves comprises a pivotally connected bell crank within the casing and screw means at each end of each arm of the bell crank cooperative with the respective valves.

3. The mechanism claimed in claim 1 wherein said casing is provided with a pressure relief valve responsive to pressure differential between the pressure in the duct and the atmosphere and a safety valve also responsive to pressure differential between the pressure in the duct and the atmosphere.

4. In a mechanism for controlling the pressure within an aircraft cabin, a self contained supply of high pressure air on the aircraft, a pressure control means in direct communication with said air pressure source, a casing supported exteriorly of the cabin and having a duct in communication with the interior of the cabin, a discharge valve in the casing adapted to establish communication between said duct and the atmosphere, means connecting the discharge valve to the pressure control means, the discharge valve being responsive to the pressure control means and to the cabin pressure, an inlet valve in the casing communicating with the duct and in direct communication with the high pressure air, movable means operatively associated with the inlet valve and in communication with and responsive to the pressure in the duct, and means operatively connected to the discharge valve and the inlet valve operative on the pressure conditions existing in the duct to open one valve and close the other valve and vice versa.

References Cited in the file of this patent

UNITED STATES PATENTS

| | | |
|---|---|---|
| 2,393,343 | Schroeder | Jan. 22, 1946 |
| 2,399,326 | Crot | Apr. 30, 1946 |
| 2,463,487 | Widgery et al. | Mar. 1, 1949 |
| 2,641,985 | Jensen | June 16, 1953 |
| 2,641,986 | Arthur | June 16, 1953 |
| 2,672,086 | Jensen | Mar. 16, 1954 |